United States Patent [19]

Schellhaas

[11] 4,365,578

[45] Dec. 28, 1982

[54] SURFACE-EFFECT AEROFOIL BOAT

[75] Inventor: Rolf Schellhaas, Grossbieberau, Fed. Rep. of Germany

[73] Assignee: Gunther W. Jorg, Grossbieberau, Fed. Rep. of Germany

[21] Appl. No.: 172,241

[22] Filed: Jul. 25, 1980

[30] Foreign Application Priority Data

Jul. 31, 1979 [DE] Fed. Rep. of Germany ....... 2931020

[51] Int. Cl.³ .............................................. B63B 1/16
[52] U.S. Cl. ............................... 114/272; 114/67 A; 244/105; 440/37
[58] Field of Search ................. 114/272, 271, 56, 273, 114/125, 54, 67 A; 440/37; 244/123, 105, 106; 181/225, 277

[56] References Cited

U.S. PATENT DOCUMENTS

| 1,477,816 | 12/1923 | Forrand | 181/277 |
|---|---|---|---|
| 1,712,758 | 5/1929 | Durand | 440/37 |
| 1,778,467 | 10/1930 | Pettersen | 244/106 |
| 2,259,625 | 10/1941 | Dornier | 244/106 |
| 2,271,227 | 1/1942 | Roseher | 440/37 |
| 3,019,754 | 2/1962 | Welshausen | 114/54 |
| 3,222,012 | 12/1965 | Piasecki | 244/51 |
| 3,422,782 | 1/1969 | Ripley | 114/125 |
| 3,934,533 | 1/1976 | Wainwright | 114/273 |
| 3,960,103 | 6/1976 | Rey | 114/273 |

FOREIGN PATENT DOCUMENTS 2303972 9/1975 Fed. Rep. of Germany .
16878 of 1913 United Kingdom ................ 114/273

*Primary Examiner*—Trygve M. Blix
*Assistant Examiner*—Jesús D. Sotelo
*Attorney, Agent, or Firm*—Fidelman, Wolffe & Waldron

[57] ABSTRACT

A surface-effect aerofoil boat having two aerofoils arranged in tandem and having a gap for a propulsion or air screw between a vertical fin and an aerodynamic rudder and wherein the aerofoils are designed as hollow bodies subdivided into compartments some of which being provided with flooding and emptying devices. The rear aerofoil seen in the direction of travel is clipped with respect to the geometry of its trailing edge in a polygonal or rounded-off manner. The gap in the plane of rotation of the propulsion or air screw is widened in its radially outer zone relative to the inner zone near the axis.

13 Claims, 3 Drawing Figures

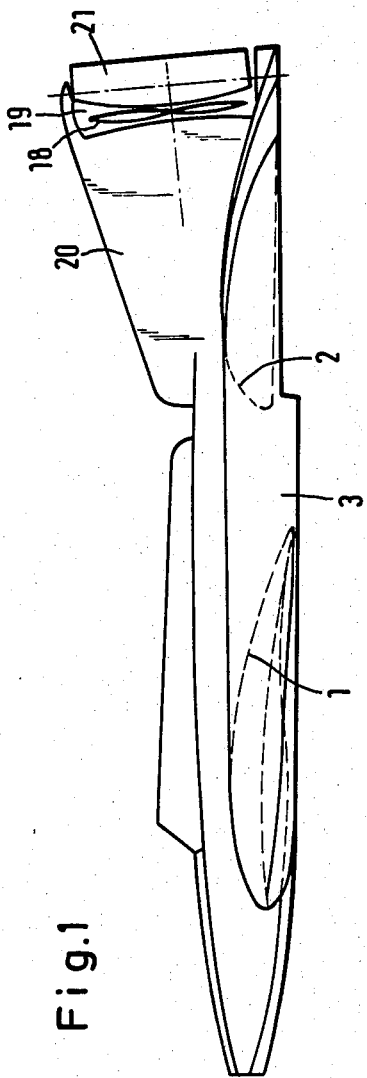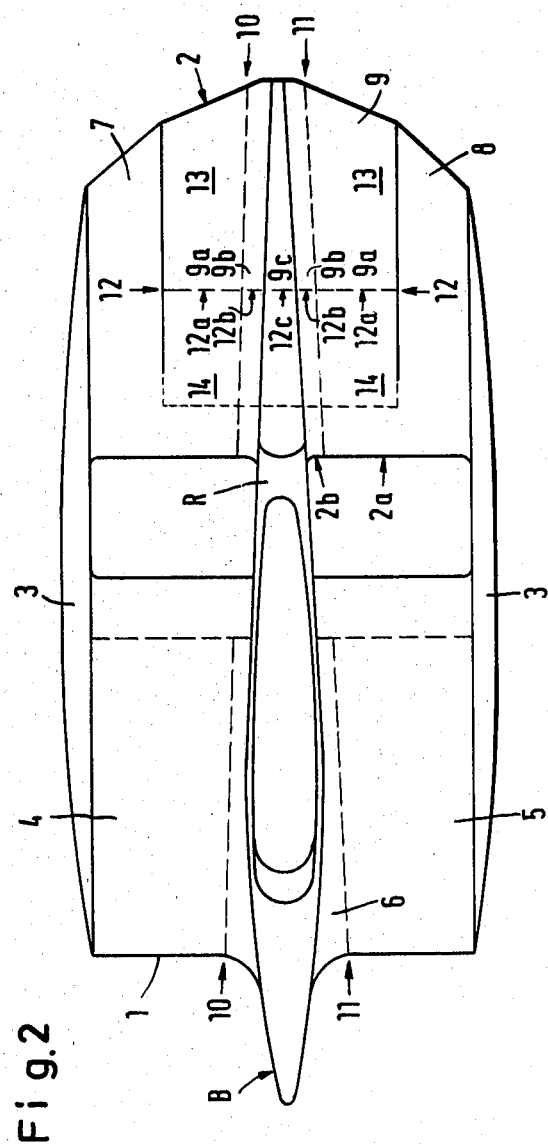

SURFACE-EFFECT AEROFOIL BOAT

The invention relates to a surface-effect aerofoil boat having two aerofoils arranged in tandem, at approximately the same height.

Surface-effect aerofoil boats of this type have been known for some time. For example, inherently stable aerodynamic ground-effect vehicles, according to the tandem aerofoil principle, are described in German Auslegeschrift 1,756,013 and German Auslegeschrift 2,303,972, in which the front aerofoil is predominantly loaded, in the lift direction, by the dynamic air pressure occurring in the aerodynamic ground effect, while the rear aerofoil stabilises the flight height of the vehicle, acting as an aerodynamic control device which is less dependent on the ground-effect.

The conditions imposed on the aerofoils of tandem surface-effect aerofoil vehicles during the flight phase necessitate differentiated aerofoil section configurations and dissimilar aerofoil locations, relative to each other. German Auslegeschrift 1,756,013 thus describes a tandem ground-effect vehicle, in which the front aerofoil is designed as a parallel-chord wing with end-plates, while the rear aerofoil is designed as a delta wing, extending in an arrow-shape in the direction of the longitudinal axis of the vehicle.

In German Auslegeschrift 2,303,972, the aerofoils are designed as parallel-chord wings, arranged at a separation equal to approximately half the aerofoil section thickness, the aerofoil sections of the wings being respectively configured to suit the predominantly lifting or predominantly stabilising function, so that the front wing is loaded in the lift direction mostly from the higher pressure side, whilst the rear wing, in contrast, is principally loaded from the lower pressure side.

Tandem surface-effect aerofoil vehicles, conforming to the principles and embodiments mentioned, have performed outstandingly in practical tests. Whilst, however, the flight phase has naturally occupied the foreground of interest during the research and development of ground-effect vehicles up to the present time, the problems which present themselves during the take-off phase, above all of water vehicles, have hitherto remained without satisfactory solution.

In order to achieve maximum lift during the take-off phase, before clearing the water, the aerofoils of surface-effect aerofoil boats must move over the water surface and as close to the surface as possible. This condition is best achieved by allowing the vehicle to float on its aerofoils. Before clearing the water on take-off, surface-effect aerofoil boats must always float with the aerofoils in the water, if they are to fly efficiently. However, in surface-effect aerofoil boats according to the prior art, having aerofoil sections which are differently configured with regard to the flight phase, floating leads to the situation that the bow section settles deeper, in the rest attitude, than the tail section. The start of the take-off phase is thereby impeded, since the flying boat tends to pitch under at slow speed. Moreover, in the case of the known embodiments of the rear aerofoils, sliding on the water surface is impeded, during the take-off phase, by the existence of a large contact area between the rear wing and the water surface. The sliding movement is particularly inhibited by the water resistance at the trailing edge of the rear wing, which lies in the water over its entire length, as for example in the case of the embodiment according to the German Auslegeschrift 2,303,972.

To render the flying boat readily controllable in all phases of movement (floating, sliding, flying), and at all velocities, the propulsion airscrew must run in a gap between the vertical fin and the aerodynamic rudder, in order to expose the aerodynamic rudder to a strong airflow at all times. Such an arrangement of the airscrew is known according to the prior art, but this arrangement entails the disadvantage that increased propeller noise is generated by the gap effect.

The object of the invention is to reduce the water resistance of the surface-effect aerofoil boat during the sliding phase by design-related measures, to subdue the noise emission from the airscrew, and to improve the floating attitude of the flying boat in such a manner that an optimum angle of attack of the flying boat, relative to the water surface, is achieved and a pitching-under incident is effectively prevented.

This object is achieved by means of a surface-effect aerofoil boat of the type initially mentioned, characterised in that the aerofoils are designed as hollow bodies which are sub-divided into compartments by fixed or adjustable intermediate bulkheads, some of the compartments being provided with flooding and emptying devices, the rear aerofoil, seen in the direction of travel, being clipped with respect to the geometry of its trailing edge, in a polygonal or rounded-off manner such that, in the floating attitude, the central part of the surface-effect aerofoil boat is deeply immersed in the water and, at the average take-off velocity, the lift is at a maximum and the length of wetted underside of the aerofoil is at a minimum, and that the gap in the plane of rotation of the airscrew, between the vertical fin and the aerodynamic rudder, is widened in its radially outer zone, relative to the inner zone near the axis.

The improvement of the floating attitude of the surface-effect aerofoil boat, according to the invention, is achieved primarily by sub-dividing the aerofoils into flotation compartments and trimming compartments. In an advantageous embodiment, a trimming compartment is to be provided in the central section of the rear aerofoil and the side sections are to be designed as flotation compartments. In this design, the polygonal or rounded-off configuration of the aerofoil trailing edge leads to a reduction in the size of the flotation compartments and hence to a reduction in the buoyancy, whereby deeper immersion of the tail of the flying boat is achieved, just as by flooding the trimming compartments. The measures taken to reduce the size of the rear aerofoil and to design a trimming compartment thus work together towards achieving the object of obtaining a better initial take-off attitude. The polygonal or rounded-off configuration of the rear aerofoil, together with a trailing edge which is swept forward in the outer region, reduces, according to the invention, the water resistance of the flying boat during the sliding phase, since, following the lifting of the wing during the take-off phase, no further direct contact with the water occurs in the outer region, while at the same time a maximum dynamic pressure effect is retained.

Before take-off, the trimming compartment provided can be flooded in a controllable manner by means of an adjustable slide-valve, in order to achieve optimum immersion of the tail of the flying boat and as favourable an angle of attack for take-off as possible, corresponding to the payload distribution. Since the water taken on for trimming represents unnecessary ballast during the flight phase, the rear aerofoil, which is the first to lift out of the water during the acceleration, should if possible be emptied while the sliding phase is still in progress, before lifting clear of the water. This can be brought about by means of openings, appropriately located in the wing centre-section near the waterline.

In addition to the trimming compartments in the aerofoils, one or more trimming compartments can also be provided in the body region of the surface-effect aerofoil boat. The size of these compartments can be adjusted by slide-valves, in the same manner as the compartments in the aerofoils, and the compartments can be flooded and emptied via openings near the waterline.

The compartmented type of construction of the aerofoils, according to the invention, represents an additional safety factor in the event of damage to the structure of the boat. For this reason, it is prudent to design also the front aerofoil in the form of independent flotation compartments, even if no trimming compartments need be provided in order to improve the attitude on the water. Furthermore, the segmented type of construction allows the aerofoils to be disassembled into individual sections, significantly facilitating transport and assembly. In particular, it is proposed, according to the invention, to attach the outer flotation compartments of the aerofoils to the body structure by means of hinges and to design these flotation compartments so that they can be folded upwards, in order to remain within the widths allowing transport by road vehicles or by rail, even in the case of relatively large flying boats.

The segmentation of the aerofoils can be effected by a honeycomb-type arrangement of the bulkheads of the individual compartments. In an arrangement which is even simpler and more weight-saving, flexible air-filled plastic bags are placed in the aerofoils, these bags forming independent flotation bodies. The interior of the flotation compartments can be completely filled with air-bags, lying in contact with each other. On the other hand, the trimming compartments are only partially filled with air-bags, so that the interspace between the air-bags forms a flooding and emptying void to which water can be admitted. The size of this void can be varied by pneumatically inflating or exhausting the air-bags.

It has been recognised that the cause of the intense noise generation by an airscrew, located in a clearance gap between the vertical fin and the aerodynamic rudder, resides in the fact that, in the previous designs, the clearance gap has parallel edges, although the rotational velocity of the propeller blades, and hence the airflow velocity, increases from the propeller hub outwards. A significant noise reduction is achieved by the design measure whereby the clearance gap is widened in its radially outer zone relative to the radially inner zone, in conformity with this velocity profile. At the same time, the good control characteristics of the airscrew arrangement, as described, are not adversely affected, since the overall length of the clearance gap is subject to small or only slight alterations, compared to earlier embodiments.

The invention is explained in greater detail, by reference to an embodiment shown in the drawings, in which:

FIG. 1 shows a side view of a surface-effect aerofoil boat,

FIG. 2 shows a plan view of the surface-effect aerofoil boat according to FIG. 1.

Figure 3:
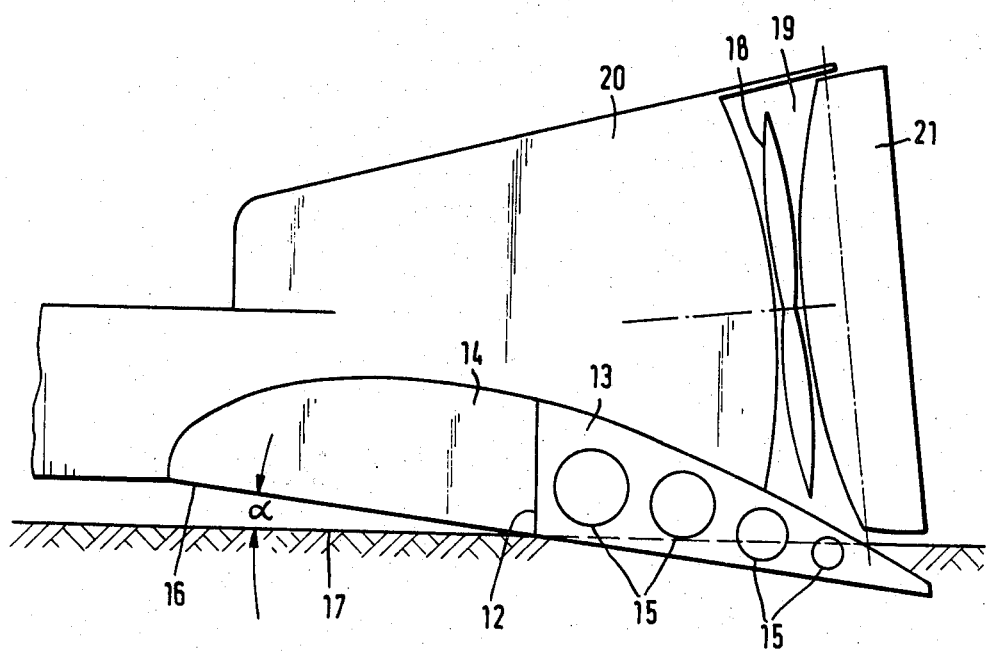
FIG. 3 shows a side view of the tail trimming compartment of the surface-effect aerofoil boat, this compartment floating in the water, with immersion.

The ground-effect vehicle shown in the drawings possesses a body R, a front aerofoil 1 and a rear aerofoil 2, these aerofoils being arranged in tandem, at approximately the same height, and being joined to each other by means of end-plates 3. The front aerofoil 1 consists of two outer flotation compartments 4, 5 and an inner flotation compartment 6. The outer flotation compartments 4, 5 are separated from the inner flotation compartment 6 by double-walled bulkheads and are hinged, at the bulkhead-edges 10 and 11, to the body section of the surface-effect aerofoil boat, in such a manner that they can be folded upwards for transport purposes. The rear aerofoil 2 is similarly sub-divided by double-walled bulkheads, into an inner aerofoil segment 2b and two outer aerofoil segments 2a, which are hinged at the bulkhead-edges 10 and 11 in a manner allowing upward folding. In addition, two outer flotation compartments 7, 8 and a central trimming compartment 9 are divided-off in the tail region of the surface-effect aerofoil boat. This tail trimming compartment 9 is divided, by means of an adjustable bulkhead 12, into a ballast compartment 13, to which water can be admitted, and an unflooded region 14. The ballast compartment 13 is in communication with the water via a series of openings 15, which allow the water ballast to flood in and allow rapid emptying during the sliding phase. In the floating attitude, a particular volume of the tail trimming compartment 9 fills with water, depending on the position of the movable bulkhead 12, leading to a deeper or shallower immersion of the trailing edge of the aerofoil 2. The immersion depth of the rear aerofoil 2 determines, in turn, the angle of attack $\alpha$ of the lower edge 16 of the aerofoil, relative to the water surface 17. Thus, by adjustably moving the bulkhead 12, an optimum angle of attack $\alpha$ can be preset for take-off.

In detail, the tail trimming compartment 9 consists of a body trimming compartment 9c having an adjustably movable bulkhead 12c, two inner aerofoil trimming compartments 9b, located in the inner aerofoil segment and having adjustably movable bulkheads 12b, and two outer aerofoil trimming compartments 9a, located in the outer aerofoil segments 2a and having adjustably movable bulkheads 12a. The bulkheads 12, 12b, 12c can be adjustably moved, coupled together or independently of each other.

An additional body trimming compartment (not shown) can be provided in the tip of the bow B of the surface-effect aerofoil boat.

Due to the polygonal or rounded-off configuration of the trailing edge of the rear aerofoil 2, the flotation compartments 7 and 8 are, on the one hand, reduced in size in order to improve the floating attitude of the flying boat and, on the other hand, the length of the aerofoil edge in contact with the water surface during the sliding phase is reduced to essentially the region lying between the bulkhead-edges 10 and 11. The reduced water friction thus leads to significantly improved sliding behaviour, compared to earlier surface-effect aerofoil boat designs.

The propulsion-screw 18 of the flying boat runs in a gap 19 between the vertical fin 20 and the aerodynamic rudder 21, the gap 19 being designed, according to the invention, with a bi-concave shape, seen in lateral projection, for the purpose of noise-reduction.

I claim:

1. In a surface-effect aerofoil boat having a body, noise portion, tail portion, central axis through the length of said body, front and rear tandemly arranged aerofoils attached to said body, a vertical fin, a pivotally attached aerodynamic rudder, and a driven propeller mounted for rotation on a propeller axis which is oriented in the general direction of said central axis, the improvement comprising:

means for subdividing said boat to provide hollow compartments at the stern, at least one of said compartments providing a flotation compartment for said boat;

means for trimming said boat by flooding and emptying at least a portion of said compartment of said boat with ballast water from a body of water on which said boat is floatable such that pitching-under of the bow of said boat is avoided during take-off and the angle of attack and lift of at least one of said aerofoils is optimized relative to a surface of said body of water for lift-off of said boat clear of said surface;

means for increasing lift and decreasing drag of said tail portion along a line of contact of an underside of said tail portion with the surface of said body of water during take-off; and a gap between said fin and said rudder, said propeller rotating through said gap, and means for reducing the noise generated by rotation of said propeller through said gap.

2. The improvement as in claim 1, wherein said noise reducing means comprises:

a geometry of said gap such that said gap is narrower at said propeller axis and wider radially outward from said propeller axis.

3. The improvement as in claim 2, wherein said gap is provided by a bi-concave cut-out in said fin.

4. The improvement as in claim 1, wherein said lift increasing and drag decreasing means comprises:

a geometry of said tail portion such that said rear aerofoil comprises a leading edge, a trailing edge, a length from said leading edge to said trailing edge in the direction of said central axis, central portions spaced on each side of and proximate said central axis; outer portions spaced on each side of and distal said central axis; said length diminishing from said central axis to each of said outer portions such that said trailing edge extends substantially below said water surface to increase said line of contact prior to take-off, said line of contact diminishing during said take-off to increase lift and decrease drag of said rear aerofoil.

5. The improvement as in claim 4, and further comprising at least one flotation compartment in each of said outer portions and wherein said trimming means comprises:

at least one trimming compartment in said tail portion to and from which said ballast water may flow, respectively, during landing and take-off of said boat.

6. The improvement as in claim 5, wherein said trimming compartment is provided with openings spaced lengthwise along said tail portion, said openings communicable with said water to provide variable ballast such that said trimming compartment ballast decreases as said line of contact decreases and increases as said line of contact increases.

7. The improvement as in claim 1, wherein said subdividing means comprises:

adjustable bulkheads for varying the sizes of said compartments.

8. The improvement as in claim 1, and further comprising:

inflatable air bags within said compartments of said trimming means for varying the sizes of said compartments such that voids within said compartments are variable by inflation and deflation of said bags to vary the amount of ballast water within said voids.

9. The improvement as in claim 1, wherein said front aerofoil comprises subdivided, flotation compartments.

10. The improvement as in claim 1, and further comprising means for hinging said front and rear aerofoils upwardly such that an overall width of said boat is decreasable for storage and transport of said boat.

11. The improvement as in claim 1, wherein said noise reducing means comprises a geometry of said gap such that said gap is narrower at said propeller axis and wider radially outwardly from said propeller axis to provide a tail void and a rudder void between a generally planar locus, generated by rotation of said propeller, and said tail and rudder, respectively, at least one of said voids increasing radially outwardly from said propeller axis.

12. In a surface-effect aerofoil boat having a body, nose portion, tail portion, central axis through the length of said body, front and rear tandemly arranged aerofoils attached to said body, a vertical fin, a pivotally attached aerodynamic rudder, and a driven propeller mounted for rotation on a propeller axis which is oriented in the general direction of said central axis, the improvement comprising:

means for subdividing said boat to provide hollow compartments at the stern, at least one of said compartments providing a flotation compartment for said boat;

means for trimming said boat by flooding and emptying at least a portion of said compartment of said boat with ballast water from a body of water on which said boat is floatable such that pitching-under of the bow of said boat is avoided during take-off and the angle of attack and lift of at least one of said aerofoils is optimized relative to a surface of said body of water for lift-off of said boat clear of said surface;

means for increasing lift and decreasing drag of said tail portion along a line of contact of an underside of said tail portion with the surface of said body of water during take-off; and a gap between said fin and said rudder, said propeller rotating through said gap, and means for reducing the noise generated by rotation of said propeller through said gap and comprising a geometry of said gap such that said gap is narrower at said propeller axis and wider radially outwardly from said propeller axis to provide a tail void and a rudder void between a generally planar locus, generated by rotation of said propeller, and said tail and rudder respectively, at least one of said voids increasing radially outwardly from said propeller axis.

13. The improvement as in claim 12, wherein both of said voids increase radially outwardly from said propeller axis.

* * * * *